(12) United States Patent
White

(10) Patent No.: US 7,461,368 B2
(45) Date of Patent: Dec. 2, 2008

(54) ADDING CODE COMMENTARY TO SOURCE CODE DURING SOFTWARE DEBUGGING

(75) Inventor: Matthew B White, Bishops Waltham (GB)

(73) Assignee: International Business Machines Corporation, Armonk, NY (US)

(*) Notice: Subject to any disclaimer, the term of this patent is extended or adjusted under 35 U.S.C. 154(b) by 803 days.

(21) Appl. No.: 10/892,457

(22) Filed: Jul. 15, 2004

(65) Prior Publication Data

US 2005/0108686 A1    May 19, 2005

(30) Foreign Application Priority Data

Nov. 19, 2003    (GB) ................. 0326903.2

(51) Int. Cl.
  *G06F 9/44*    (2006.01)
(52) U.S. Cl. .................. 717/129; 717/125; 715/230
(58) Field of Classification Search ............... 717/124, 717/125, 129; 715/230
  See application file for complete search history.

(56) References Cited

U.S. PATENT DOCUMENTS

2002/0120919 A1 * 8/2002 Aizenbud-Reshef et al. 717/127
2003/0056198 A1 * 3/2003 Al-Azzawe et al. ......... 717/127
2004/0111394 A1 * 6/2004 Fish et al. ....................... 707/3

OTHER PUBLICATIONS

Tim Fors, "IDEBUG—The IBM Distributed Debugger," Aug. 1, 2000 [online], accessed Nov. 30, 2007, Retrieved from Internet <URL: http://www-128.ibm.com/developerworks/ibm/library/i-debug>, 5 pages.*
David Seager, "Linux software debugging with GDB," Feb. 1, 2001 [online], accessed Nov. 30, 2007, Retrieved from Internet <URL: http://www.ibm.com/developerworks/library/l-gdb/>, 8 pages.*
Matthew White, "Debugging integrated Java and C/C++ code," Nov. 1, 2001 [online], accessed Nov. 30, 2007, Retrieved from Internet <URL: http://www.ibm.com/developerworks/java/library/j-jnidebug/index.html>, 9 pages.*

* cited by examiner

*Primary Examiner*—Eric B Kiss
(74) *Attorney, Agent, or Firm*—Francis Lammes; Stephen J. Walder, Jr.; Herman Rodriguez

(57) ABSTRACT

Software debugging having means for linking with source code code commentary relating to the source code's execution is provided. An advantage is achieved by storing the code commentary received from a user during software debugging about a program's execution directly alongside the source code.

6 Claims, 4 Drawing Sheets

```
Fred.java
1  /*
2   * Created on 05-Nov-2003
3   *
4   *
5   *
6   */
7
8  /**
9   */
10 public class Fred {
11
12     public static void main(String[ ] args) {
13
14         int var;
15
16         for (var = 0; var < 10; var++) {
17
18             var = var * 10;
19
20             System.out.println("Var is "+var);
21
22         }
23
24
25     }
26 }
27
```

Think this variable should be 6.

*FIG. 3*

ADDING CODE COMMENTARY TO SOURCE CODE DURING SOFTWARE DEBUGGING

FIELD OF THE INVENTION

This invention relates to computer software development, and particularly to debugging software.

BACKGROUND OF THE INVENTION

In the field of this invention it is known that when debugging a software problem in a debugger, for example VISUAL STUDIO™, there are quite often situations in which a programmer wants to make a note of some information (e.g., value of memory at a given address, result from a function, which option is taken at a switch statement, etc.). Usually the programmer simply jots this information down on separate notepaper such as POST-IT™ notes. This can easily result in a collection of POST-IT notes full of numbers that mean little or nothing to the programmer a few minutes later.

However, this approach has the disadvantage that notes cannot be associated with development-time artefacts. Although a possible solution might be to embed this information in program comments, this is inappropriate since the source code (and program comments) should not change to incorporate notes.

A need therefore exists for a system and method for software debugging wherein the abovementioned disadvantages may be alleviated.

SUMMARY OF THE INVENTION

In one illustrative embodiment, a method is provided for software debugging. The illustrative embodiment executes software under the control of a debugger on a computer device having a processor coupled to a memory. The illustrative embodiment interrupts, through a breakpoint, an execution of the software under debugger control at a point in the software where the breakpoint is inserted. Upon interrupting the execution of the software, the illustrative embodiment receives user input information from a user relating to the execution of the software. In the illustrative embodiment, the user input information is code commentary provided by the user relating to the execution of the software at the point where the software is interrupted during the execution of the software. The illustrative embodiment links the code commentary relating to the execution of the software with the breakpoint in the software with a compiler. The illustrative embodiment stores the code commentary in a data structure of the debugger. During a subsequent execution of the software under the control of the debugger, the illustrative embodiment interrupts, through the breakpoint, the execution of the software under the debugger control at the point in the software where the breakpoint is inserted. Responsive to code commentary being linked with the breakpoint, the illustrative embodiment displays on a display coupled to the processor via an interface the code commentary relating to the execution of the software together with the corresponding element of the source code.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

One system and method for software debugging incorporating the present invention will now be described, by way of example only, with reference to the accompanying drawings, in which:

FIG. 3 shows a screenshot of a screen display of a computer device of a user in accordance with an embodiment of the invention.

DESCRIPTION OF PREFERRED EMBODIMENTS

An embodiment of the invention enables an integrated development environment (IDE) to dynamically store information linked with various parts of a program, such as syntactic elements of the program, during program execution, for example during a debugging session. To meet this end, the information, or code commentary, is linked with the source code. The information that is linked to the source code is separate from program comments which are about the program's static nature. The program comments are typically prepared prior to the debugging. Both the source code and program comments should remain fixed without any change in a read only format.

Figure 1:
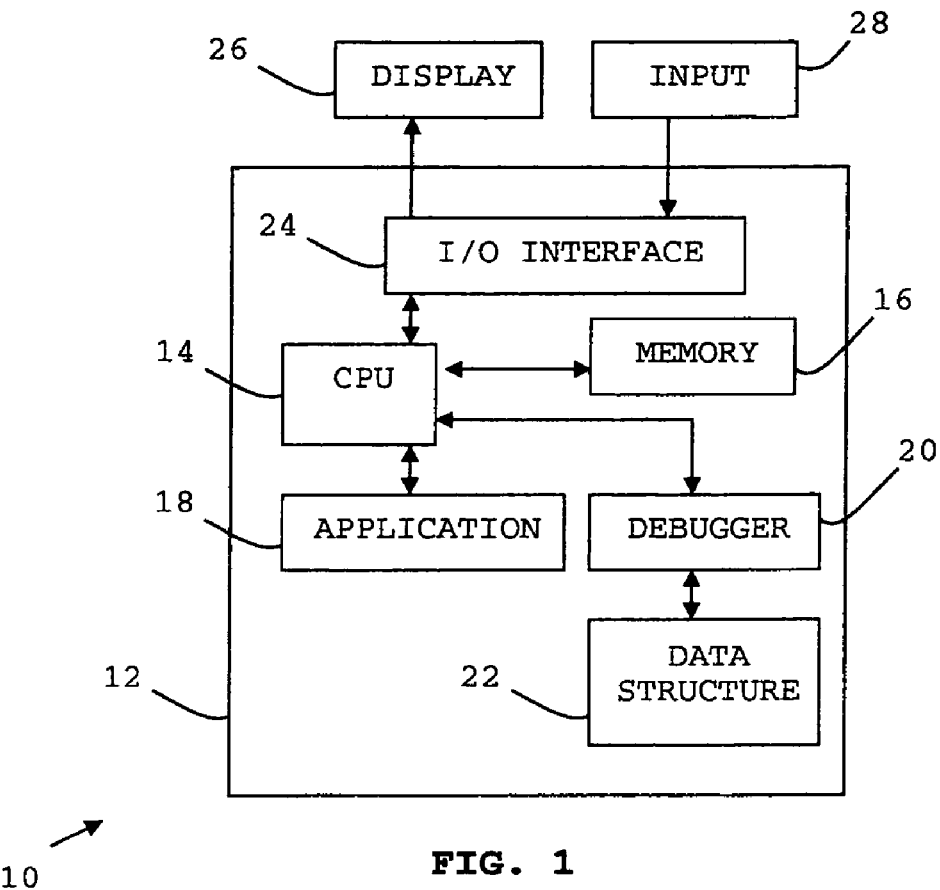
FIG. 1 shows a computer device implementing an embodiment of the invention.
Figure 2:
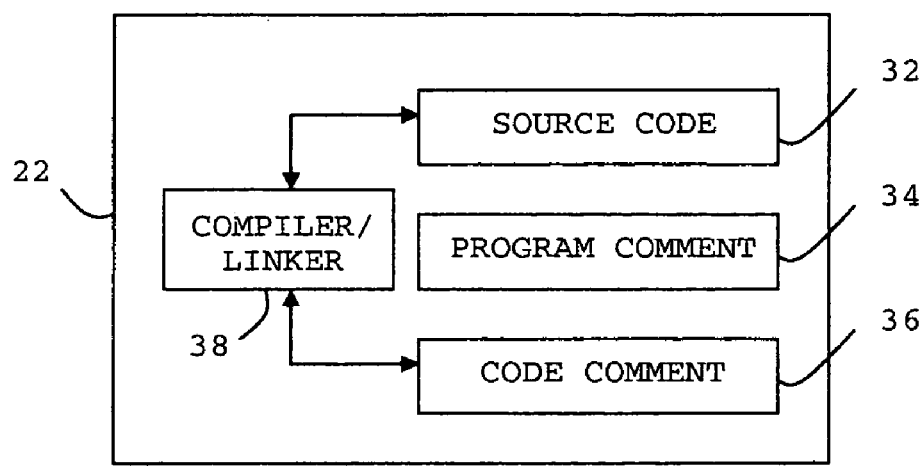
FIG. 2 shows a data structure of a debugger/application program in more detail in accordance with an embodiment of the invention.

FIG. 1 shows a system 10 in which an embodiment of the invention may be implemented. The system comprises a computer device 12 which has a central processing unit (CPU) 14 for processing information within the computer device, for example running software applications 18 and debugger 20. A memory 16 is provided such as random access memory (RAM) and read only memory (ROM). The CPU is in communication with peripheral devices such as screen display 26 or input means such as a keyboard 28 via an input/output (I/O) interface 24. The debugger 20 also comprises a data structure 22 which is shown in more detail in FIG. 2. The term debugger refers to the controlling logic as well as an interface that may be integrated with an integrated development environment (IDE). The data structure 22 of the debugger may include source code 32, program comments 34, and code commentary 36. Linking the code commentary with the source code is compiler/linker 38.

The code commentary, information, or note 36 is information that a user such as a developer found out or discovered during a debugging session while the application or program was executing. A debugging session is defined to be the activity of running a program under a debugger control, where the user monitors code execution in any manner and if so desired, for example, on a line by line basis. The code commentary information that the user determines in this manner may relate to a specific element of a program. The code commentary is linked to the various syntactic elements of a language, of course varying between languages. Also, the code commentary may be linked to specific specialisations of the language per platform, for example, a structure representing a window 44 on graphic user interface (GUI) platforms as shown in FIG. 3. For example the information may be linked to elements 48 of the program such as for example specific variables, methods, functions, source code files, specific statements, a specific line of code, an individual module, or the like. The information 36 that is stored may be in free format, for example, "this value looks odd, maybe it should be 6", or "I think this value should be 6.". The information may also be in a more formatted form, for example for variables, the actual value and memory address of the variable is stored. Functions may also store more information about parameters. The code commentary may also be in a combination format such as the free format in combination with the more formal format.

The code commentary information may be versioned along configurable lines. For example each run of the code may version the code commentary information. The information may be persisted in such a way, that the information may be retrieved in a later debugging session. This helps a user by enabling the user to maintain a "working knowledge" of a program, typically in order to solve a program defect. This information may also be accessible by other users which has a wider implication for helping other users. The persisted information may be thought of as creating the "code commentary", which is different to and more than just the program comments in the code which provide a static commentary which are just based on program structure and are fixed. The code commentary provides a commentary that relates to dynamic execution, in which the program is running in a specific test context.

The code commentary note may not only be attached to a specific piece of the code, the note may also be attached or linked to a specific point in the program's execution. Aspects of the linking or associating may include, for example function call stack, identification of the thread the call is made on, version of the code that was being run, or the like. These factors may not be exclusive, and different implementation languages and operating systems may have different concepts with different configurations. For example in a multi-processor machine, the processor that was running the program might also be recorded.

An implementation uses data structures 26 to store the code and notes 36. Any debugger implementation 20 has a preset set of data structures to store a representation of the source code under examination which is discussed in Rosenburg, "How Debuggers Work—Algorithms, Data Structures, and Architecture", (1996), John Wiley & Sons Inc., ISBN 0471149667. The data structure of the debugger is extended to allow data to be attached to any particular syntactic element. The implementation of the data structures used with a debugging engine is particular to a particular implementation. Symbol information that a compiler/linker 38 produces is also specific to a given platform and/or machine architecture.

A generic mechanism along the following lines may be used on an architecture similar to WINDOWS™ or UNIX™. A reference to a module, and function, together with an offset into the module is a configuration that may identify a specific program element (at an assembler level). The debugger then using knowledge of the source code converts this to a user representation. The mapping from assembler to source code is dependant on the symbol tables generated from the compiler/linker. For example, a table that may be used to store data showing example data may be:

| Module Name | Function Name | Offset | Data |
|---|---|---|---|
| MainDLL.dll | Calculate( ) | 500 | "This instruction never seems to complete" |

In one embodiment the data that may be attached is in extensible markup language (XML) format to allow maximum flexibility. Of course the data attached may be in different formats such as plain ASCII text that was entered by a user. However the XML format provides a user a "free form" of data storage. In addition an XML format allows flexibility when displaying the data.

In addition to the "free format" data, additional "context" information may be associated. This includes, but is not necessarily limited to, a unique identification of the instance of the debugging run. An application running on the operating system such as UNIX™ or like operating system, is given a "process id". The process id is typically a numeric value, and may potentially differ from each run. This may form the basis of this unique identification for context information. Additional context information may include the specifics of the machine's hardware (memory size, processor speed for example), or possibly the other applications being run on the machine at the time.

With this configuration, each debugging run is distinct. For example the program during one debugging session may be run with one value and the program during another debugging session may be run with a different value, and hence a different context. For example, the code being examined may be a set of high precision mathematical modelling functions. The developer may wish to test these with different numerically input values. The context of these functions may also be changed by using different operating system/third party mathematical libraries.

Figure 4:
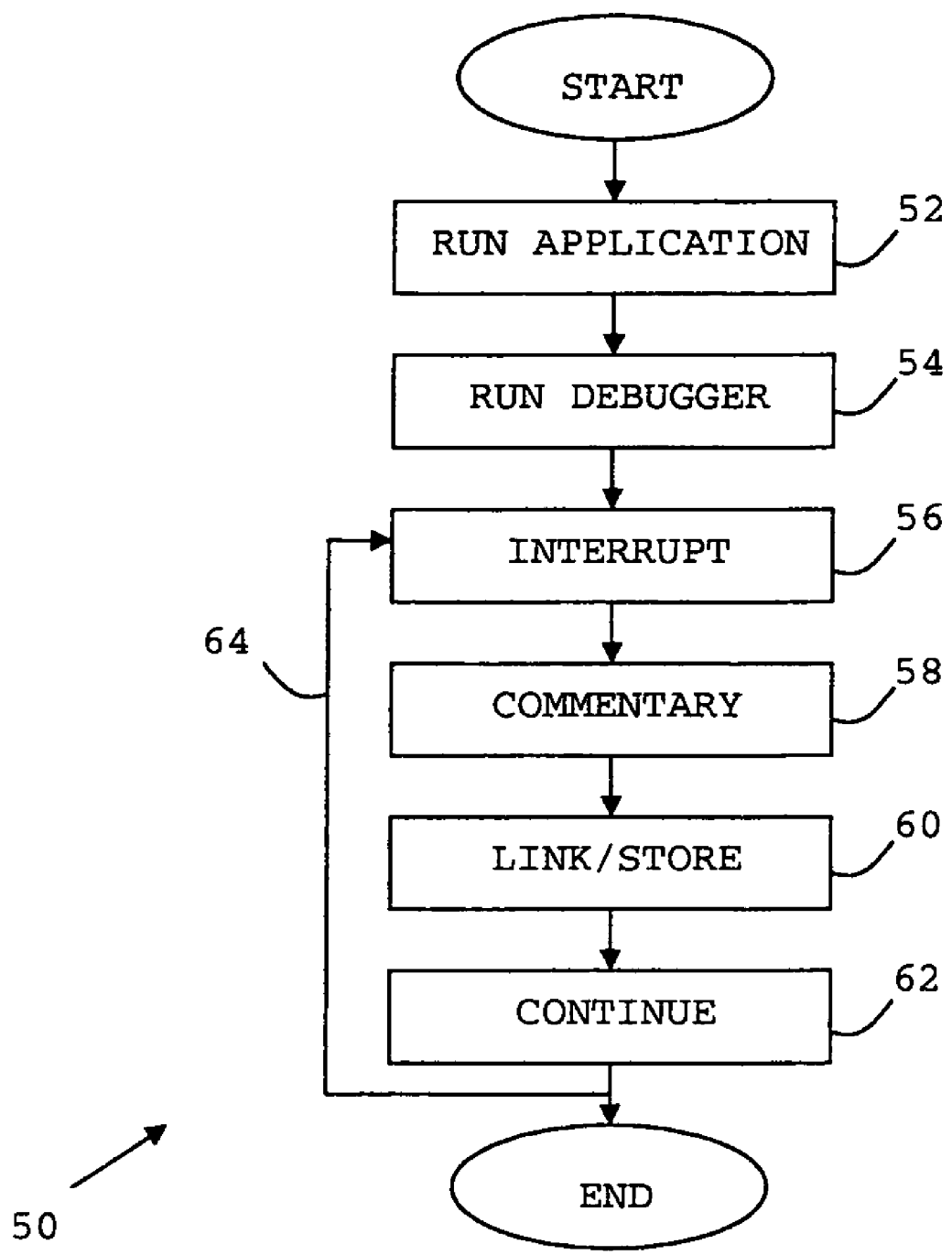
FIG. 4 shows a flow chart of a method in accordance with an embodiment of the invention.

As shown in a method 50 in accordance with an embodiment of the invention of FIG. 4, when a program is run 52 under debugger control 54, the user may be able to enter information 58 of any type. This entered information may be linked 60 with any syntactic element in the program and stored in the data structure 22. The program may resume or continue 62, and another interrupt or stop 56 may be instigated by the user as indicated by arrow 64. The interrupt or stop in the program execution may be inserted by the user in the form of a break point. For example the user may insert a break point on a given set of source code. When the program execution reaches the line of code having the break point, execution stops. The user is then able to control the execution accordingly, ranging from, for example, single stepping over lines of code, to completely resume execution of the program.

Figure 5:
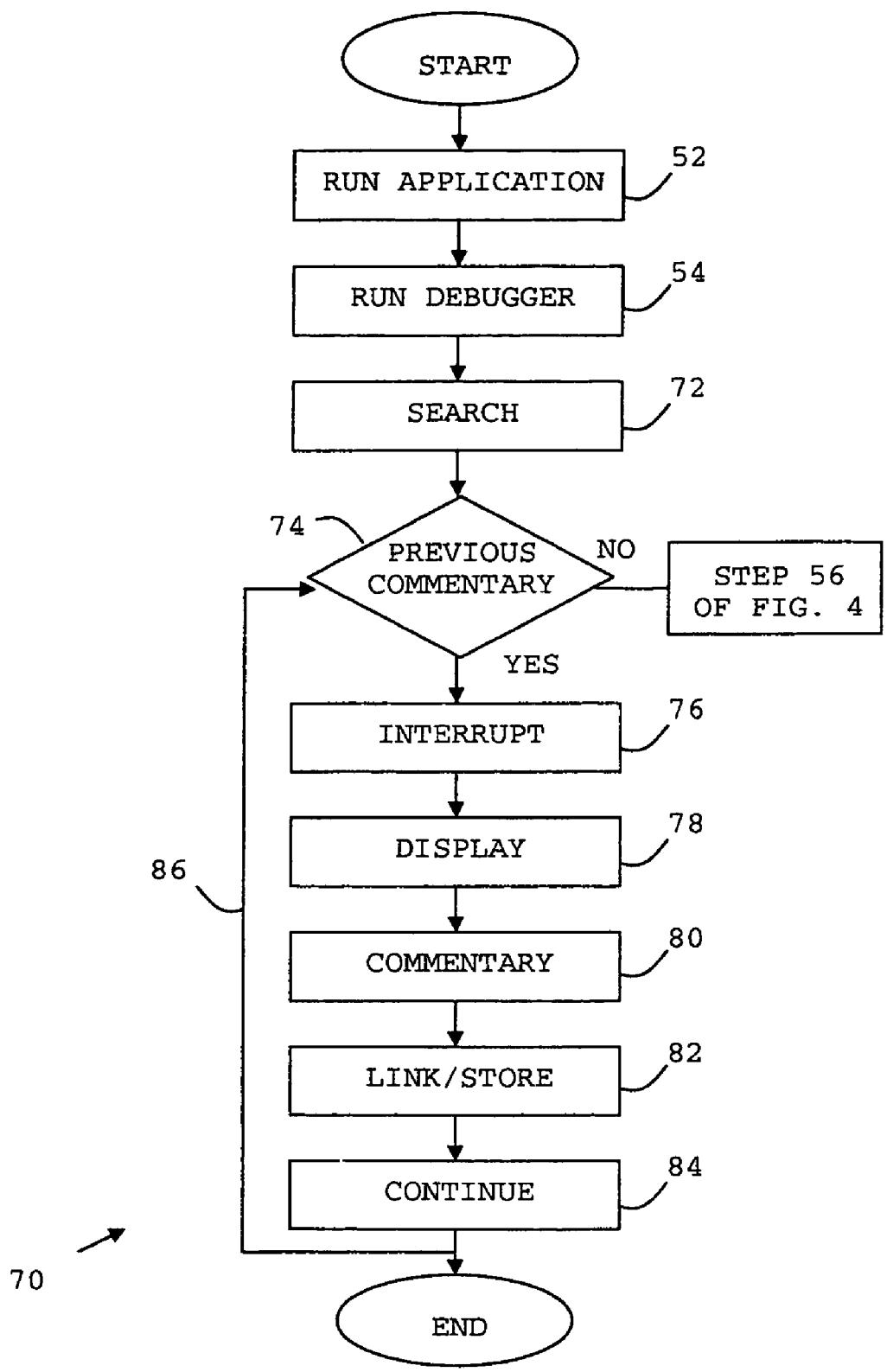
FIG. 5 shows a flow chart of a method in accordance with an embodiment of the invention.

As shown in a method 70 in accordance with an embodiment of the invention of FIG. 5, when a program is run 52 under debugger control 54 for a subsequent run, and there has been commentary 58 linked and stored 60 with corresponding source code, the data structure is searched 72 for the previous commentary 74. If there is no previous commentary, the program may be interrupted 56 by a user as discussed and shown in FIG. 4. If there is previous commentary, the program is stopped 76 and the commentary is displayed 78 on display 26 as shown in FIG. 3. The debugger at this point has stopped 76 on the highlighted line 42. In a previous debugging session, the user has entered a comment attached to an element of the source code, for example a variable 48 as shown in FIG. 3. This is displayed in a "pop-up" style window 44 as shown in FIG. 3. Information that the user learned during a previous debugging session is therefore presented. The user may provide additional information or edit the existing information 80. The new information is linked with the element of source code and stored 82 in the data structure. The program debugging session resumes and continues 84, and the user or the system may interrupt the program again to display commentary 78 from a previous run or enter new commentary 58,80 as shown by arrow 86. This may be repeated for each previous comment stored, or as many times as a user desires to interrupt the program. If there is no previous commentary, the program may be interrupted 56 by a user as shown in FIG. 4. If previous notes or annotations were entered and exist in the data structure corresponding to an element of the source code, the notes and corresponding source code may be displayed. For example, for each point in the source code where previous notes were added, the execution stops at these points during a subsequent execution of the program. In one embodiment, a break point may be added to the line of code where a note or annotation is added. When the program is run again, the break point when encountered stops execution of the program and displays the commentary or information corresponding to the element of the source code.

The information need not of course be presented in this format. This though is the format that appears for one embodiment. Other formats may be envisaged, for example the information may be displayed in a textual list format elsewhere in the interface, or the IDE may display the information interleaved with the source code as though the information were comment. The user may then add additional information that they may have discovered in the current debugging session.

The display of the data may be decoupled from the actual data structures, therefore providing flexibility for information display, which may be tailored to a user's specific requirements, and also the environment in which the user is working.

It will be understood that the system and method for software debugging described above provides advantages, such as storing code commentary information learned by a user such as a developer during a debugging session about a program's execution directly alongside the code. It will be appreciated that specific embodiments of the invention are discussed for illustrative purposes, and various modifications may be made without departing from the scope of the invention as defined by the appended claims.

What is claimed is:

1. A method for software debugging comprising:
   executing software under the control of a debugger on a computer device having a processor coupled to a memory;
   interrupting, through a breakpoint, an execution of the software under debugger control at a point in the software where the breakpoint is inserted;
   upon interrupting the execution of the software, receiving user input information from a user relating to the execution of the software, wherein the user input information is code commentary provided by the user relating to the execution of the software at the point where the software is interrupted during the execution of the software;
   linking the code commentary relating to the execution of the software with the breakpoint in the software with a compiler;
   storing the code commentary in a data structure of the debugger;
   during a subsequent execution of the software under the control of the debugger, interrupting, through the breakpoint, the execution of the software under the debugger control at the point in the software where the breakpoint is inserted; and
   responsive to code commentary being linked with the breakpoint, displaying on a display coupled to the processor via an interface the code commentary relating to the execution of the software together with the corresponding element of the source code.

2. The method of claim 1, further comprising:
   responsive to encountering the breakpoint, searching the data structure of the debugger for the code commentary relating to the execution of the software previously stored in the data structure.

3. The method of claim 1, wherein the code commentary is displayed using a pop-up window.

4. The method of claim 1, further comprising:
   responsive to interrupting the execution of the software during the subsequent execution of the software, receiving additional user input information from the user relating to the execution of the software;
   linking the additional user input information relating to the subsequent execution of the software with the user input information and the breakpoint in the software with the compiler; and
   storing the additional user input information in the data structure of the debugger.

5. The method of claim 1, wherein the user input information is stored in an extensible markup language (XML) format.

6. The method of claim 1, wherein the user input information is stored in an American Standard Code for Information Interchange (ASCII) text format.

* * * * *